H. ABRAHAM.

STRIP SHINGLE.

APPLICATION FILED JULY 7, 1921.

Reissued Feb. 7, 1922. 15,280.

Inventor
Herbert Abraham

By his Attorney

George Ramsey

UNITED STATES PATENT OFFICE.

HERBERT ABRAHAM, OF NEW YORK, N. Y., ASSIGNOR TO THE RUBEROID CO., A CORPORATION OF NEW JERSEY.

STRIP SHINGLE.

15,280. Specification of Reissued Letters Patent. Reissued Feb. 7, 1922.

Original No. 1,326,899, dated January 6, 1920, Serial No. 258,703, filed October 18, 1918. Application for reissue filed July 7, 1921. Serial No. 483,063.

*To all whom it may concern:*

Be it known that I, HERBERT ABRAHAM, a citizen of the United States, residing at the city, county, and State of New York, have invented certain new and useful Improvements in Strip Shingles, of which the following is a specification.

My invention relates to strip-shingles of prepared roofing.

One of the objects of the invention is to produce strip-shingles of such form that a given area of roof deck can be covered and made watertight with a smaller quantity of material than has heretofore been required.

Another object is to produce a shingle-strip having a plurality of tabs along its upper edge.

A still further object is to cut the strips so that the cutaway portions of one row of shingles form the tabs of the adjacent row.

A further object is to eliminate the likelihood of curling by removing the corners of the shingle-like portions and utilizing the material cut away from one strip to form the tabs of an adjacent strip.

This invention pertains particularly to an improvement in strip-shingles of the type having their lower edges slotted at intervals so that when laid in overlapping courses they will simulate the appearance of individual shingles.

Heretofore in the art, with strips of that type, having, for example, substantially the proportions and shape described and shown in Patent No. 1,150,298, issued August 17th, 1915, to F. C. Overbury, of which a 10 inch width represents the minimum that has proved commercially practicable, it requires approximately 250 square feet of shingle surface to cover 100 square feet of roof deck, whereas with shingle-strips made according to my invention, that is, having tabs along their upper edges, the same area of roof deck can be covered and rendered watertight to substantially the same degree with a minimum of approximately 200 square feet of shingle surface.

More generally considered, my improved shingle-strip may be defined as one having parallel straight longitudinal edges, with the lower edge indented at intervals by recesses leading into slots to provide shingle-like portions, and with the upper edge having spaced tabs which substantially correspond in size and shape to the recesses.

Realizing that my invention may be embodied in structures other than those disclosed herein, I desire it to be understood that the present disclosure is to be considered as illustrative and not in the limiting sense.

In the accompanying drawings, Figure 1 is a plan view of a preferred form of strip-shingle embodying my invention;

Figure 1:
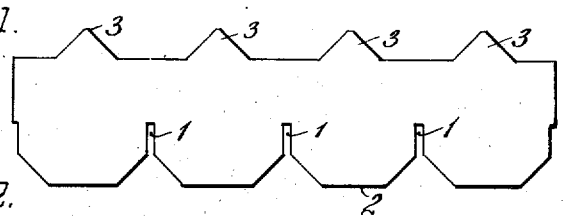
Figure 2:
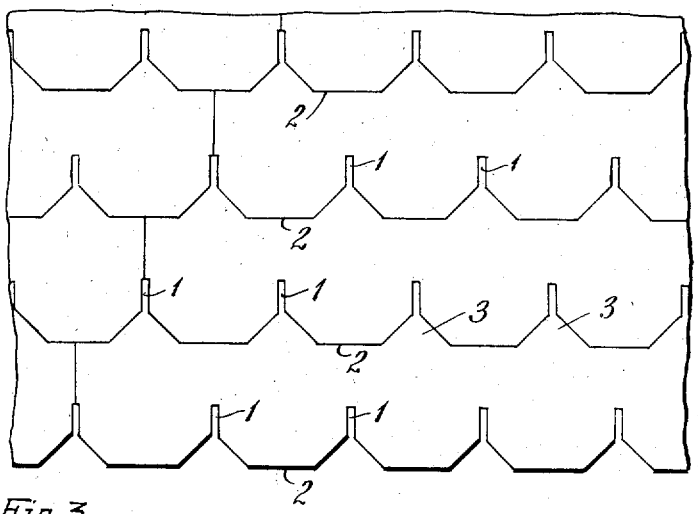
Figure 2 is a view of a fragment of a sheet of prepared roofing indicating the preferred method of manufacturing the shingle-strips.

According to my invention, I take a sheet of prepared roofing and cut out a plurality of rows of small oblong-shaped openings 1, the openings in any one row being preferably, though not necessarily, disposed midway between the openings in the adjacent rows. In the completed strip-shingles, shown in Figures 1 and 4, these openings form the slots between the adjacent shingle-like portions. The sheet is also severed along wavy-like lines 2 intersecting an end of the openings, as shown in Figure 2. The cutting of the lines 2 may be performed either separately or simultaneously with the cutting of the openings. This produces a multiple shingle-strip having a series of tabs 3 along its upper edge, and having its lower edge formed of a series of straight lines extending parallel to the major axis of the strip and separated by slots opening into cut-out portions or recesses which substantially correspond in shape to the tabs, said tabs on the upper edge being preferably, though not necessarily, disposed in staggered relation to the cut-out portions of the lower edge. The strips are generally cut into blocks of four shingles each, as indicated in Figure 2, to form the completed article shown in Figures 1 and 4. It will be seen by reference to Figure 2 that the tabs 3 of any one strip are formed of material cut out to provide the recesses of the adjacent strip, which recesses respectively lead into the slots of said strip. In this way the shingle-strips are produced without loss of material other than that caused by the cutting out of the openings 1 and the necessary trimming of the sheet.

Figure 4:
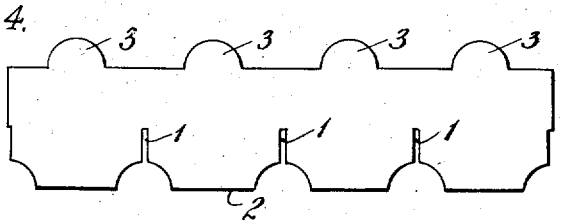
Figure 4 is a modification showing a strip-shingle having semi-circular shaped tabs.

By varying the character of the cutting line 2 the tabs 3 may be made of other than triangular shape, for example, they may be of semi-circular shape, as shown in Figure 4.

Figure 3:
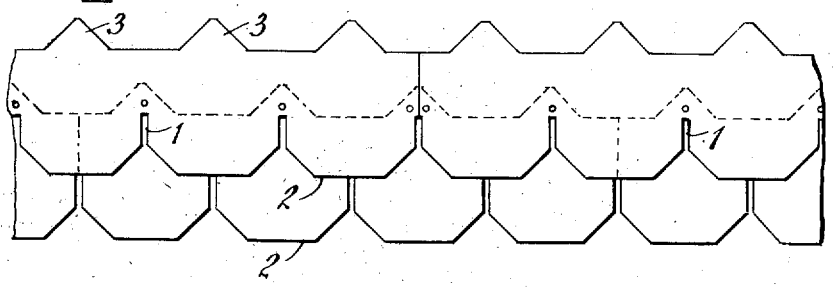
Figure 3 is a section of laid strip-shingles.

Preferably the strips are fastened to the roof deck by means of nails driven above the slots as illustrated in Figure 3, it being understood that the nails of each lower course are covered by the course next above. When strips of the proportions shown are used the nails will penetrate through the tabs of the strip below, in which case the tabs will function as nailing tabs. However, if wider strips are used, then the nails will penetrate the under strip through the body of the strip.

As shown in the drawings, the depth of the combined recesses and slots, which define the extent that the strip is to be exposed when laid, may be substantially one-half of the width of the individual shingle portions of the strip. To secure the greatest economy of material I prefer to employ strips wherein the width of the strip, excluding the tabs, is twice the depth of the combined recesses and slots and laid in the manner shown.

It will be seen that the overlap measured vertically between the upper ends of the slots of any course and the uppermost portion of the next underlying course will, at the minimum, be equal to the altitude of the tabs, thus providing substantially the same protection against leakage at those points as is afforded by the old type of shingle-strip of corresponding over-all width, but with a considerable saving of shingle material. Obviously, however, the width of the body portion of the strip may be increased without departing from the scope of my invention. Thus it may be advisable to use wider strips in which case the depth of the combined recesses and slots will be less than one-half of the width of the body portion. This will require a correspondingly greater quantity of material to cover a given area of roof deck, but will still result in a substantial economy of material over the old type of shingle-strip of similarly increased over-all width.

What I claim is:

1. A multiple shingle-strip, having spaced nailing tabs along its upper edge, and having its lower edge formed of a series of straight lines extending parallel to the major axis of the strip, with intervening cut-out portions corresponding substantially in shape to the nailing tabs and disposed in staggered relation thereto, whereby, when the strips are laid as described, not more than two square feet of shingle material are required to waterproof each square foot of roof surface.

2. A shingle-strip having its lower edge formed of a series of straight longitudinal lines with intervening recesses leading into slots and having along its upper edge spaced tabs substantially similar in size and shape to the recesses and disposed in staggered relation thereto.

3. A shingle-strip having parallel substantially straight longitudinal edges, the lower edge being broken at intervals by recesses leading into slots to form shingle-like portions; and the upper edge having spaced tabs disposed over the middle of the shingle-like portions.

4. A shingle-strip having parallel substantially straight liongitudinal edges, the lower edge being broken at intervals by recesses leading into slots to form shingle-like portions; and the upper edge having tabs located at intervals thereon.

5. A shingle-strip having parallel substantially straight longitudinal edges, the lower edge being divided at regular intervals into shingle-like portions by recesses leading into slots, said recesses and slots combined extending inwardly the distance that the strip is intended to be exposed when laid; and the upper edge having spaced apart tabs substantially similar in size and shape to the recesses.

6. A shingle-strip having parallel substantially straight longitudinal edges, the lower edge being divided at regular intervals into shingle-like portions by recesses leading into slots, said recesses and slots combined extending inwardly the distance that the strip is intended to be exposed when laid; and the upper edge having tabs substantially similar in size and shape to the recesses and disposed in staggered relation thereto.

7. A roof composed of a plurality of shingle-strips each having parallel substantially straight longitudinal edges, the lower edge being broken at intervals by recesses leading into slots to form shingle-like portions; and the upper edge having tabs, said strips being laid in overlapping courses with the lower edge of the shingle-like portions of each strip aligned with the upper ends of the slots in the course immediately below, said tabs serving to increase the extent of overlap.

8. A roof composed of a plurality of shingle-strips, each having parallel substantially straight longitudinal edges, the lower edge being broken at intervals by recesses leading into slots to form shingle-like portions, and the upper edge having tabs disposed in staggered relation to the recesses; said strips being laid in overlapping courses with the lower edge of the shingle-like portions of each strip aligned with the upper ends of the slots in the course immediately below, so that said tabs tend to increase the lap about the slots.

9. A shingle-strip having parallel substantially straight edges with shingle-like portions on one edge and tabs on the other edge, the length of the shingle-like portions being substantially twice the length of the tabs, both being measured transversely of the strip.

10. A shingle-strip comprising shingle-like portions on one edge and tabs on the other edge with the width of the base of each tab being substantially equal to the distance between the bases of lower edges of adjacent shingle-like portions.

11. A shingle-strip having shingle-like portions on one edge and tabs on the other edge, the length of the shingle-like portions being substantially twice the length of the tabs, both being measured transversely of the strip, and with the width of the base of each tab being substantially equal to the distance between the lower edges of adjacent shingle-like portions.

HERBERT ABRAHAM.